US008260060B2

(12) United States Patent
Iizuka et al.

(10) Patent No.: US 8,260,060 B2
(45) Date of Patent: Sep. 4, 2012

(54) COMPARISON METHOD, COMPARISON SYSTEM, COMPUTER, AND PROGRAM (75) Inventors: Ken Iizuka, Kanagawa (JP); Hideo Sato, Tokyo (JP)

(73) Assignee: Sony Corporation, Tokyo (JP)

(*) Notice: Subject to any disclaimer, the term of this patent is extended or adjusted under 35 U.S.C. 154(b) by 884 days.

(21) Appl. No.: 11/719,233

(22) PCT Filed: Nov. 17, 2005

(86) PCT No.: PCT/JP2005/021126
§ 371 (c)(1),
(2), (4) Date: Feb. 4, 2009

(87) PCT Pub. No.: WO2006/054645
PCT Pub. Date: May 26, 2006

(65) Prior Publication Data
US 2009/0169116 A1 Jul. 2, 2009

(30) Foreign Application Priority Data

Nov. 18, 2004 (JP) ................... 2004-334266

(51) Int. Cl.
*G06K 9/68* (2006.01)

(52) U.S. Cl. ........................................... 382/218
(58) Field of Classification Search .......... 382/115–125, 382/209, 218; 340/5.8, 5.81–5.83; 713/186; 902/3
See application file for complete search history.

(56) References Cited

U.S. PATENT DOCUMENTS

| 6,901,155 | B2 * | 5/2005 | Xia et al. ............... 382/125 |
| 7,079,670 | B2 * | 7/2006 | Pan et al. ............... 382/124 |
| 7,689,006 | B2 * | 3/2010 | Govindaraju et al. ........ 382/115 |
| 2004/0193893 | A1 * | 9/2004 | Braithwaite et al. .......... 713/186 |

FOREIGN PATENT DOCUMENTS

| JP | 02-025925 | 1/1990 |
| JP | 07-234939 | 9/1995 |
| JP | 2000-030062 | 1/2000 |
| JP | 2001-052127 | 2/2001 |

OTHER PUBLICATIONS

Ratha, et al. "A real-time matching system for large fingerprint databases", IEEE, pp. 799-813, 1996.*
Japanese Office Action issued on Jun. 2, 2009 in connection with JP Application No. 2004-334266.
Bolle R M et al: "Biometric perils and patches" Pattern Recognition, Elsevier, GB, vol. 3, No. 12, Dec. 2002, pp. 2727-2738.

(Continued)

*Primary Examiner* — Daniel Mariam
(74) *Attorney, Agent, or Firm* — SNR Denton US LLP (57) ABSTRACT A comparison apparatus 2 designates first registration information RT1 inherent to a first parameter obtained by applying generalized Hough transform processing to a registered image AIM based on the set first parameter as the registration information RT1 used for the comparison and, designating second registration information RT1 obtained by applying generalized Hough transform processing to the registered image AIM based on a second parameter different from the first parameter as the registration information RT1 used for the comparison when receiving an instruction for change of the registration information RT1 after the designation, whereby security can be improved.

9 Claims, 8 Drawing Sheets

OTHER PUBLICATIONS

Onishi H et al: "Detection of Rotation and Parallel Translation Using Hough and Fourier Transforms" Proceedings of the International Conference on Image Processing (ICIP) Luasanne, Sep. 16-19, 1996 New York, IEEE, US vo. 3, Sep. 16, 1996, pp. 827-830.

Connie T et al: "PalmHashing: a novel approach for cancelable biometrics" Information Processing Letters, Amerstdam, NL, vol. 93, No. 1, Oct. 28, 2004, pp. 1-5.

Savvides M et al: "Cancelable biometric filters for face recognition" Pattern Recognition, 2004. ICPE 2004. Proceedings of the 17th International Conference on Cambridge, UK Aug. 23-26, 2004, Piscataway, NJ, USA, IEE, vol. 3, Aug. 23, 2004, pp. 922-925.

European Search Report, European Patent Office, Feb. 8, 2008 for corresponding European Patent Application No. 05 80 6603.

International Search Report dated Jan. 16, 2006.

* cited by examiner

$$\phi_1: \quad (r_1^1, \alpha_1^1), (r_2^1, \alpha_2^1), \ldots$$
$$\phi_2: \quad (r_1^2, \alpha_1^2), (r_2^2, \alpha_2^2), \ldots$$
$$\vdots$$
$$\phi_n: \quad (r_1^n, \alpha_1^n), (r_2^n, \alpha_2^n), \ldots$$

COMPARISON METHOD, COMPARISON SYSTEM, COMPUTER, AND PROGRAM

TECHNICAL FIELD

The present invention relates to a comparison method for comparing, for example, images, a comparison system thereof, a computer thereof, and a program thereof.

BACKGROUND ART

A comparison apparatus which carries out biometric authentication by utilizing biometric characteristics (features) inherent to a user is known.

In general, the apparatus mentioned above frequently uses biometric characteristics (features) showing characteristics which do not change much at all throughout one's life as the biometric characteristics such as fingerprints and blood vessel patterns.

DISCLOSURE OF THE INVENTION

Problem to be Solved by the Invention

In the apparatus mentioned above, however, if once registered biometric characteristic data is leaked to a third party, that biometric characteristic data is sometimes misused and the security may be lowered. Further, in order to maintain a high security, since it is better not to use the leaked biometric characteristic data, sometimes biometric characteristic data may become useless. For this reason, a comparison apparatus having a high security has been demanded.

The present invention was made in consideration with such a circumstance and has as an object thereof to provide a high security comparison method, comparison system thereof, computer thereof, and program thereof.

Means for Solving the Problem

To achieve the above object, a comparison method according to a first aspect of the present invention is a comparison method for comparing images by using registered information, including: a first step of designating first registration information inherent to a first parameter obtained by processing a registered image based on a set first parameter as the registration information used for the comparison, and a second step of designating second registration information obtained by performing the processing of the registered image based on a second parameter different from the first parameter as the registration information used for the comparison when receiving an instruction for change of the registration information after the designation in the first step.

Further, to achieve the above object, a comparison method according to a second aspect of the present invention has a first step of applying generalized Hough transform processing to the registered image based on the set parameter and storing the thus obtained registration information inherent to the parameter in a storing means and a second step of performing the comparison processing based on the input image and the registration information stored in the storing means in the first step.

Further, to achieve the above object, a comparison method according to a third aspect of the present invention is a comparison method for a comparison system including; a terminal apparatus, and a comparison apparatus for comparing the image input from the terminal apparatus, including a first step of designating first registration information inherent to a first parameter obtained by processing a registered image based on a set first parameter as the registration information used for the comparison, storing the designated registration information in a first storing means of the comparison apparatus, and then storing the registration information in a second storing means of the terminal apparatus; a second step of designating second registration information obtained by performing processing of the registered image based on a second parameter different from the first parameter as the registration information used for the comparison, when receiving an instruction for change of the registration information after the designation in the first step, and storing the registration information in the first storing means and the second storing means; and a third step of performing comparison processing based on an image input from the terminal apparatus and the registration information stored in the first storing means when the comparison apparatus compare the registration information stored in the first storing means and the registration information stored in the second storing means, and the result of the comparison is that they coincide.

Further, to achieve the above object, a comparison system according to a fourth aspect of the present invention is a comparison system including a terminal apparatus and a comparison apparatus for comparing the image input from the terminal apparatus, wherein the comparison apparatus includes a first communicating means for data communication with the terminal apparatus, a first storing means, and a first controlling means for designating first registration information inherent to a first parameter obtained by processing a registered image based on a set first parameter as the registration information used for the comparison at the time of the registration, when receiving an instruction for change of the registration information after the designation, designating second registration information obtained by performing the processing of the registered image based on a second parameter different from the first parameter as the registration information used for the comparison, storing the registration information in the first storing means, then outputting the registration information via the first communicating means to the terminal apparatus, comparing, at the time of the comparison, the registration information stored in the first storing means and the registration information received from the terminal apparatus via the first communicating means, and performing the comparison processing based on the image received from the terminal apparatus and the registration information stored in the first storing means when the result of the comparison is that they coincide, and the terminal apparatus includes a second communicating means for performing data communications with the comparison apparatus, an inputting means for inputting at least the image, a second storing means, and a second controlling means for storing the registration information received from the comparison apparatus at the time of the registration via the second communicating means in the second storing means and transmitting the image input from the inputting means at the time of the comparison and the registration information read out from the second storing means via the second communicating means to the comparison apparatus.

Further, to achieve the above object, a computer according to a fifth aspect of the present invention is a computer for comparing images by using registration information, having a controlling means for designating first registration information inherent to a first parameter obtained by processing a registered image based on a set first parameter as the registration information used for the comparison, and designating second registration information obtained by performing the processing of the registered image based on a second parameter different from the first parameter as the registration information used for the comparison, when receiving an instruction for change of the registration information after the designation.

Further, to achieve the above object, a program according to a sixth aspect of the present invention is a program executed by a computer for comparing images by using registration information, including: a first step of designating first registration information inherent to a first parameter obtained by processing a registered image based on a set first parameter as the registration information used for the comparison and a second step of designating second registration information obtained by performing the processing of the registered image based on a second parameter different from the first parameter as the registration information used for the comparison when receiving an instruction for change of the registration information after the designation in the first step.

BRIEF DESCRIPTION OF THE DRAWINGS

[FIG. 7] FIG. 7A to FIG. 7C are diagrams for explaining the operation at the time of the comparison of the terminal apparatus 1 shown in FIG. 1.

EXPLANATION OF NOTATIONS

1 . . . terminal apparatus, 2 . . . comparison apparatus, 3 . . . data communication line, 10 . . . comparison system, 11 . . . communication interface (I/F), 12 . . . user information input unit, 13 . . . biometric characteristic input unit, 14 . . . storage unit, 15 . . . memory, 16 . . . control circuit (CPU: Central Processing Unit), 21 . . . communication interface (I/F), 22 . . . database, 23 . . . image processing unit, 24 . . . random number generation unit, 25 . . . table generation unit, 26 . . . table comparison unit, 27 . . . comparison processing unit, 28 . . . memory, and 29 . . . control circuit (CPU: Central Processing Unit).

BEST MODE FOR CARRYING OUT THE INVENTION

Figure 1:
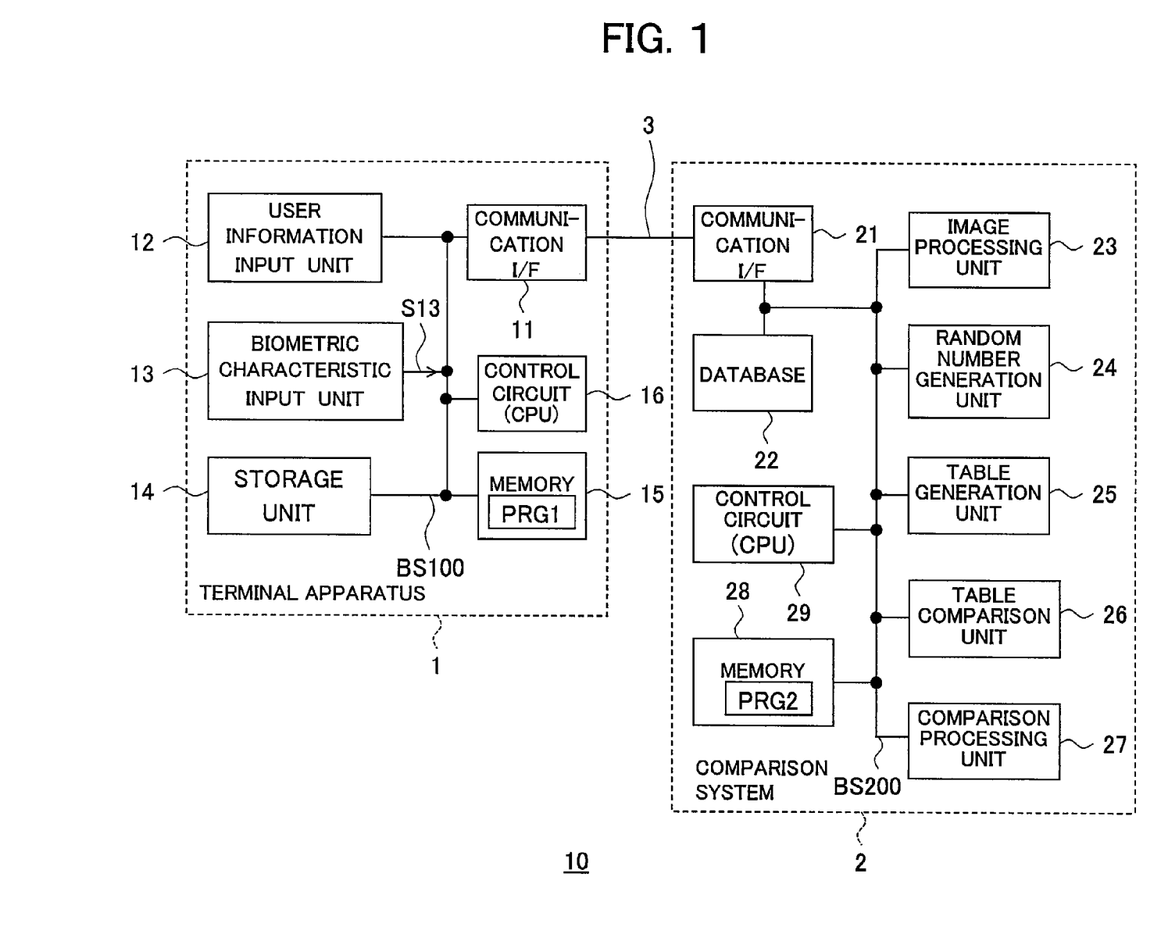
[FIG. 1] A functional block diagram of a comparison system according to an embodiment of the present invention.

FIG. 1 is a functional block diagram of a comparison system according to an embodiment of the present invention.

A comparison system 10 according to the present embodiment is a system for comparison based on biometric characteristics, and a comparison method using registration information registering biometric characteristics for comparing images, which designates first registration information inherent to a first parameter obtained by performing generalized Hough transform processing on a registered image based on a set first parameter as the registration information used for the comparison, and designating second registration information obtained by performing generalized Hough transform processing on the registered image based on a second parameter different from the first parameter as the registration information used for the comparison, when receiving an instruction for change of the registration information after the designation.

The comparison system 10 performs the comparison processing based on an input image and a designated registration information at the time of the comparison.

Below, a detailed explanation will be given with reference to the accompanying drawings.

The comparison system 10 according to the present embodiment, for example as shown in FIG. 1, has a terminal apparatus 1 and a comparison apparatus (server apparatus) 2.

The comparison system 10 corresponds to an example of the comparison system according to the present invention, the terminal apparatus 1 corresponds to an example of the terminal apparatus according to the present invention, and the comparison apparatus 2 corresponds to an example of the comparison apparatus according to the present invention.

Further, the terminal apparatus 1 and the comparison apparatus 2 correspond to an example of the computer according to the present invention.

For example, the comparison apparatus (server apparatus) 2 is operated and managed by a comparison service provider, and the terminal apparatus 1 is operated by the user.

The terminal apparatus 1 and the comparison apparatus 2 are connected by, for example, a data communication line 3. In more detail, the data communication line 3 is a communication network such as the Internet.

Terminal Apparatus 1

The terminal apparatus 1, as shown in FIG. 1, has a communication interface (I/F) 11, user information input unit 12, biometric characteristic (features) input unit 13, storage unit 14, memory 15, and control circuit (CPU: Central Processing Unit) 16.

The components are connected by a bus BS100 as shown in FIG. 1.

The communication I/F 11 corresponds to an example of the second communicating means according to the present invention. The biometric characteristic input unit 13 corresponds to an example of the inputting means according to the present invention.

The storage unit 14 corresponds to an example of the storing means according to the present invention. Further, the control circuit 16 corresponds to an example of the second controlling means of the present invention.

The communication I/F 11 performs data communications with the comparison apparatus 2 via the data communication line 3 under the control of the control circuit 16 and outputs the communication results to the control circuit 16.

The user information input unit 12 outputs for example the user information input at the time of the registration to the control circuit 16. For example, the user information is attribute data of the user such as the name and gender of the user. The user information input unit 12 includes for example a keyboard, mouse, and touch panel.

The biometric characteristic input unit 13 captures an image of for example a subject (an object) to be inspected and output an image in accordance with the imaging results as a signal S13 to the control circuit 16. In more detail, the biometric characteristic input unit 13 outputs biometric characteristic (feature) information inherent to the user such as a fingerprint or vein pattern of the user as the image signal to the control circuit 16.

The biometric characteristic input unit 13 is configured by an imaging element such as a CCD (charge coupled device) and CMOS (complementary metal-oxide semiconductor).

The storage unit 14 stores for example the registration information corresponding to the registered image, in the present embodiment, the registration information (R-table) RT1 generated by the comparison apparatus 2 mentioned later. The storage unit 14 is configured by a storage device such as a hard disc drive (HDD) and semiconductor memory.

The memory 15 is used as for example the work area of the control circuit 16. The memory 15 is configured by a storage device such as a RAM (random access memory) and ROM (read only memory).

Further, the memory 15 stores a program (RPG1) including the functions according to the present invention and initial values etc.

The control circuit 16 centrally controls the entire terminal apparatus. For example, the control circuit 16 executes the functions according to the present invention by running a program (PRG1).

The control circuit 16 for example stores the registration information (R-table) RT1 received from the comparison apparatus 2 via a communication I/F 11 in the storage unit 14 at the time of the registration and transmits the comparison image input from the biometric characteristic input unit 13 and the registration information RT1 read out from the storage unit 14 via the communication I/F 11 to the comparison apparatus 2 at the time of the comparison.

Comparison Apparatus 2

The comparison apparatus 2, as shown in FIG. 1, has a communication interface (I/F) 21, database 22, image processing unit 23, random number generation unit 24, table generation unit 25, comparison unit 26, comparison processing unit 27, memory 28, and control circuit (CPU: central processing unit) 29.

The components are connected by a bus BS200 as shown in FIG. 1.

The communication I/F 21 corresponds to an example of the first communicating means according to the present invention. The database 22 corresponds to an example of the storing means and first storing means according to the present invention. The image processing unit 23, random number generation unit 24, table generation unit 25, table comparison unit 26, comparison processing unit 27, and control circuit 29 correspond to an example of the controlling means and first controlling means according to the present invention.

The communication I/F 21 performs data communication with the terminal apparatus 1 via the data communication line 3 under the control of for example the control circuit 29 and outputs communication results to the control circuit 29.

The database 22 stores the registration information (R-table) RT1 of the user under the control of for example the control circuit 29. The database 22 is configured by a storage device such as a hard disk drive (HDD), opto-magnetic disc, and semiconductor memory.

The image processing unit 23 for example applies image processing as pre-stage processing for generating the registration information RT1 according to the present invention to the image input by the communication I/F 21 according to need under the control of for example the control circuit 29 and outputs the processing result. The image of the result of processing by the image processing unit 23 is used at the time of registration and the time of comparison.

In more detail, the image processing unit 23 applies processing to thin (narrow) the image pattern in the image. This thinning (narrowing) processing corresponds to the processing for extracting the information showing for example characteristics of the biometric information.

The random number generation unit 24 generates for example random numbers for determining a parameter according to the present invention and outputs a signal indicating the generated random numbers to the control circuit 29.

The table generation unit 25 applies for example the processing for generating different registration information in accordance with the parameter to the registered image at the time of the registration and stores the registration information generated by the processing in the database 22.

In more detail, the table generation unit 25 applies generalized Hough transform processing to the registered image based on the set parameter to generate table information as the registration information and stores the generated registration information in the database 22.

Figure 2:
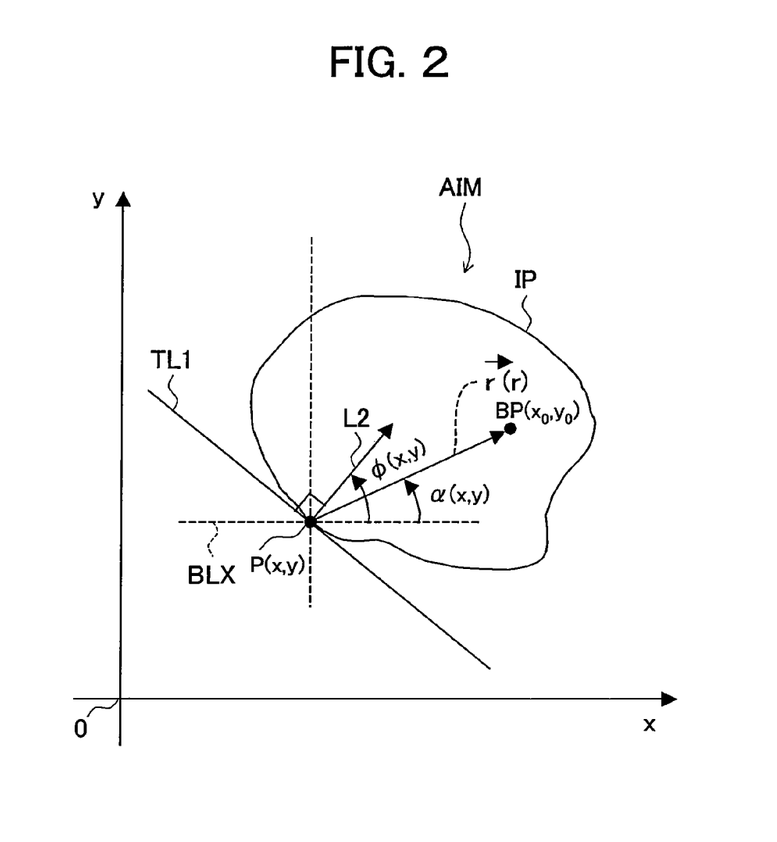
[FIG. 2] A diagram for explaining a generalized Hough transform processing at the time of image registration of a comparison system 10 shown in FIG. 1.
Figure 3:
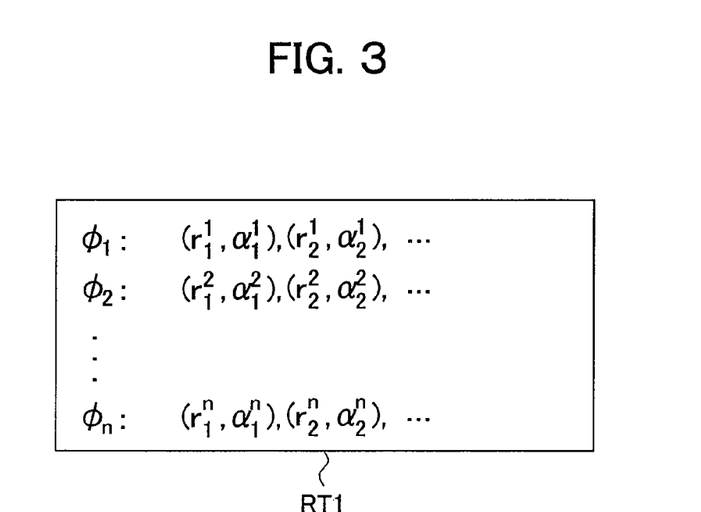
[FIG. 3] A diagram for explaining an R-table as the registration information of the comparison system 10 shown in FIG. 1.

FIG. 2 is a diagram for explaining the generalized Hough transform processing at the time of image registration of the comparison system 10 shown in FIG. 1. FIG. 3 is a diagram for explaining the R-table as the registration information of the comparison system 10 shown in FIG. 1.

In more detail, the table generation unit 25 generates, as the generalized Hough transform, for example as shown in FIG. 2, registration information (table) RT1 for linking, at a picture element position P(x, y) on an image pattern IP in a registered image AIM, first angle information $\phi(x, y)$ indicating the angle formed by a straight line L2 perpendicular to a tangent TL1 of the image pattern IP and a straight line BLX passing through the picture element position P(x, y) and parallel to a reference axis (x-axis), distance information R indicating the distance between the picture element position P(x, y) and a set position (also referred to as a reference point) $BP(x_0, y_0)$ indicating the set parameter, and second angle information $\alpha(x, y)$ indicating the angle formed by a straight line r including the picture element position P(x, y) and the set position $BP(x_0, y_0)$ and a reference axis BLX.

Here, the straight line r including the picture element position P(x, y) and the set position $BP(x_0, y_0)$ corresponds to a vector r from the picture element position P(x, y) to the set position $BP(x_0, y_0)$ in the present embodiment.

In more detail, the set position (reference point) $BP(x_0, y_0)$ as the parameter can be represented by using the distance r, first angle $\phi(x, y)$ and second angle $\alpha(x, y)$ as shown in Equation 1 and Equation 2.

[Equation 1]

$$x_0 = x + r \cdot \cos(\alpha) \tag{1}$$

[Equation 2]

$$y_0 = y + r \cdot \sin(\alpha) \tag{2}$$

Further, the table generation unit 25 finds for example the value of (r, α) by computation for all points on the image pattern in the image, classifies them using the first angle φ as an index, and generates for example registration information (R-table) RT1 as shown in FIG. 3.

In the registration information RT1 shown in FIG. 3, different values of the first angle φ, distance r, and second angle α are discriminated by suffixes.

The registration information RT1 has the characteristic feature that it is different whenever the shape of the image pattern in the image is different and whenever the reference point is different even with respect to the same shape.

The control circuit 29 stores the registration information RT1 in the database 22 linked with the user information and transmits the same via the communication I/F 21 to the terminal apparatus 1. The terminal apparatus 1 stores the registration information RT1 transmitted from the comparison apparatus 2 in the storage unit 14.

The table comparison unit 26 compares the registration information RT1 stored in the database 22 and the registration information RT1 stored in the storage unit 14 of the terminal apparatus 1 at the time of comparison and outputs a signal indicating the comparison result thereof to the control circuit 29. When judging that they coincide as the result of comparison by the table comparison unit 26, the control circuit 29 makes the comparison processing unit 27 perform the comparison processing mentioned later, while when judging that they do not coincide, stops the comparison processing.

The comparison processing unit 27 performs the comparison processing mentioned later at the time of the comparison based on the input comparison image and the registration information RT1 stored in the database 22.

The memory 28 is for example used as the work space of the control circuit 29. The memory 28 is configured by a storage device such as a RAM and ROM.

Further, the memory 28 stores a program (PRG2) including the functions according to the present invention and the initial values etc.

The control circuit 29 centrally controls the entire comparison system. For example, the control circuit 29 executes the functions according to the present invention by running the program (PRG2).

At the time of registration, the control circuit 29 designates the first registration information RT1 inherent to the first parameter obtained by processing the registered image AIM based on the set first parameter as the registration information RT1 used for the comparison and, when receiving an instruction for change of the registration information RT1 after the designation, designates second registration information RT1 obtained by processing the registered image AIM based on a second parameter different from the first parameter as the registration information RT1 used for the comparison.

Further, the control circuit 29 stores the designated registration information RT1 in the database 22, then outputs the registration information RT1 via the communication I/F 21 to the terminal apparatus 1. At the time of the comparison, it compares the registration information RT1 stored in the database 22 and the registration information RT1 received from the terminal apparatus 1 via the communication I/F 21. When the result of the comparison is that they coincide, it performs the comparison processing based on the comparison image RIM received from the terminal apparatus 1 and the registration information RT1 stored in the database 22.

Figure 4:
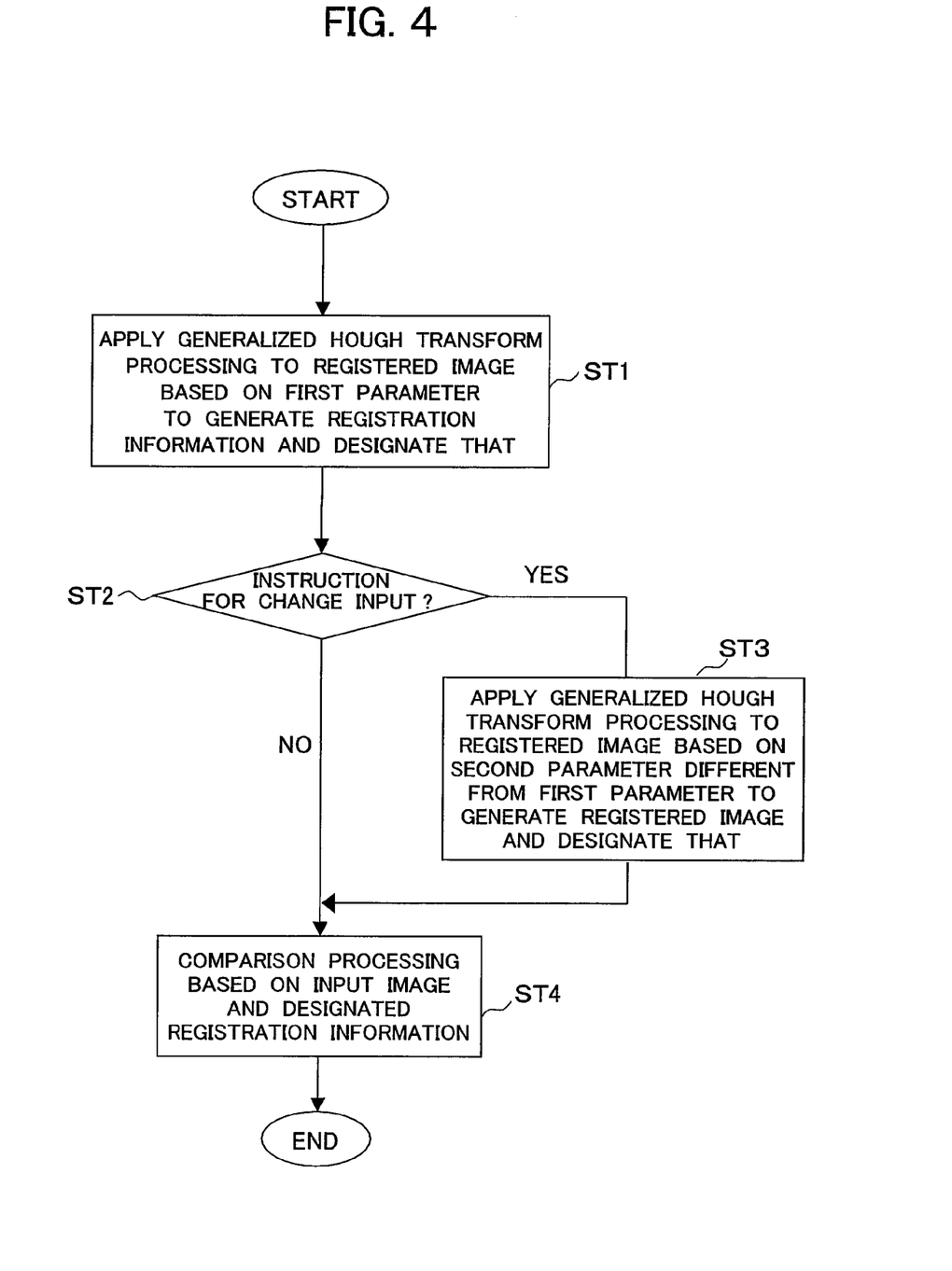
[FIG. 4] A flow chart for explaining an operation of the comparison system 10 shown in FIG. 1.

FIG. 4 is a flow chart for explaining the operation of the comparison system 10 shown in FIG. 1. A simple explanation will be given on the overall operation of the comparison system 10 with reference to FIG. 4.

At step ST1, the comparison apparatus 2 designates the first registration information RT1 inherent to the first parameter obtained by applying generalized Hough transform processing to the registered image AIM based on the set first parameter as the registration information used for the comparison.

At step ST2, the comparison apparatus 2 judges whether or not it has received input of an instruction for change of the registration information RT1 after performing the designation at step ST1, proceeds to the processing of step ST3 when judging that it has received the input, while proceeds to the processing of step ST4 when judging that it has not received the input.

At step ST3, the comparison apparatus 2 designates the second registration information RT1 obtained by applying the generalized Hough transform processing to the registered image AIM based on a second parameter different from the first parameter as the registration information RT1 used for the comparison, then proceeds to the processing of step ST4.

At step ST4, the comparison apparatus 2 performs the comparison processing based on the input comparison image RIM and the designated registration information RT1.

Below, the operation of the comparison system 10 will be explained in more detail.

Figure 5:
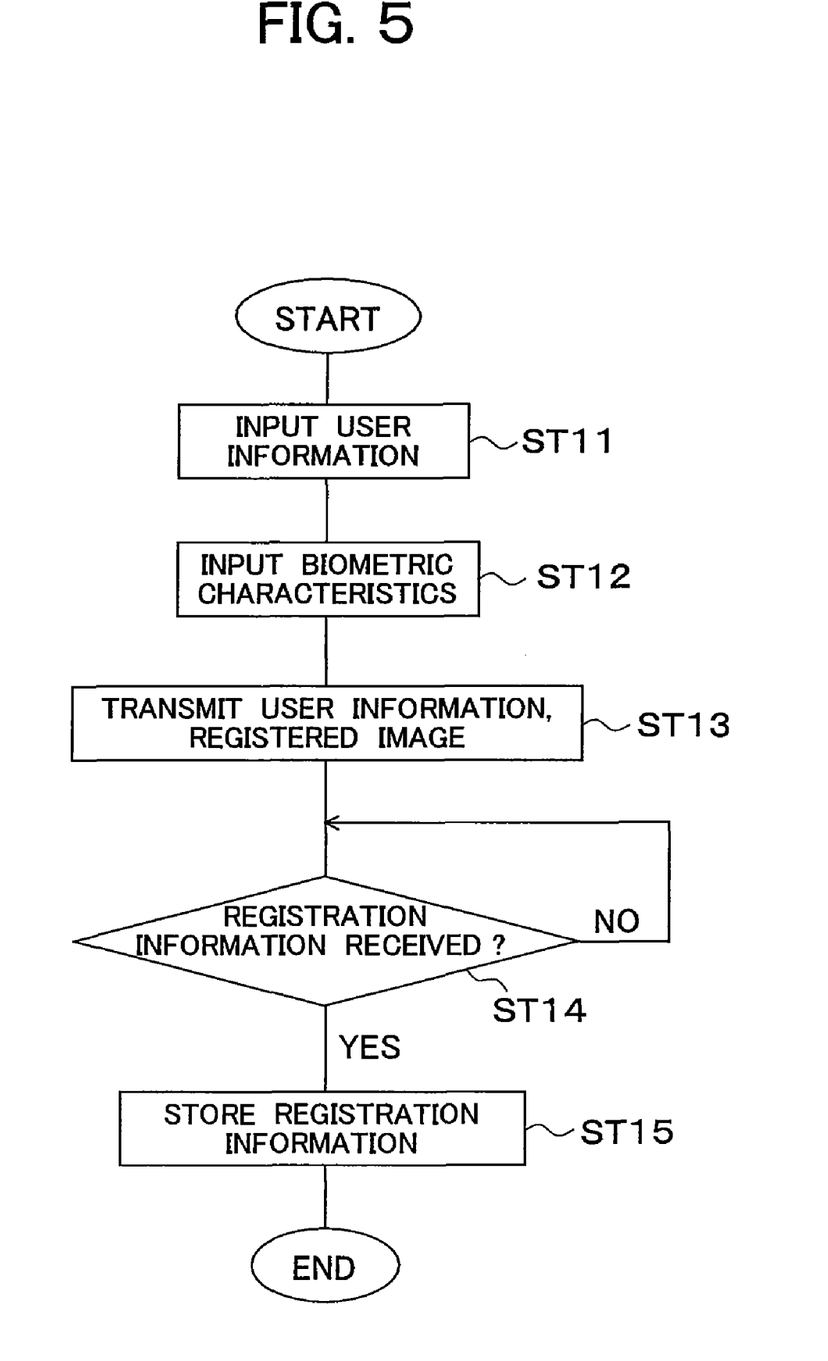
[FIG. 5] A flow chart for explaining the operation at the time of registration of a terminal apparatus 1 of the comparison system 10 shown in FIG. 1.

FIG. 5 is a flow chart for explaining the operation at the time of the registration of the terminal apparatus 1 of the comparison system 10 shown in FIG. 1. The operation at the time of the registration of the terminal apparatus 1 will be explained based on the operation of the control circuit 16 etc. with reference to FIG. 5.

At step ST11, the user information, for example, the user name, gender, and age information are input to the control circuit 16 from the user information input unit 12.

At step ST12, the image signal S13 indicating the biometric characteristics inherent to the user is input to the control circuit 16 from the biometric characteristic input unit 13.

At step ST13, the control circuit 16 transmits the user information and the registered image (biometric characteristic information) AIM via the communication I/F 11 to the comparison apparatus 2.

At step ST14, the control circuit 16 stands by until the registration information RT1 corresponding to the previously transmitted registered image AIM is received from the comparison apparatus 2 and, when it is received, proceeds to the processing of step ST15.

At step ST15, the control circuit 16 stores the registration information (template) RT1 received from the comparison apparatus 2 via the communication I/F 11 in the storage unit 14.

Figure 6:
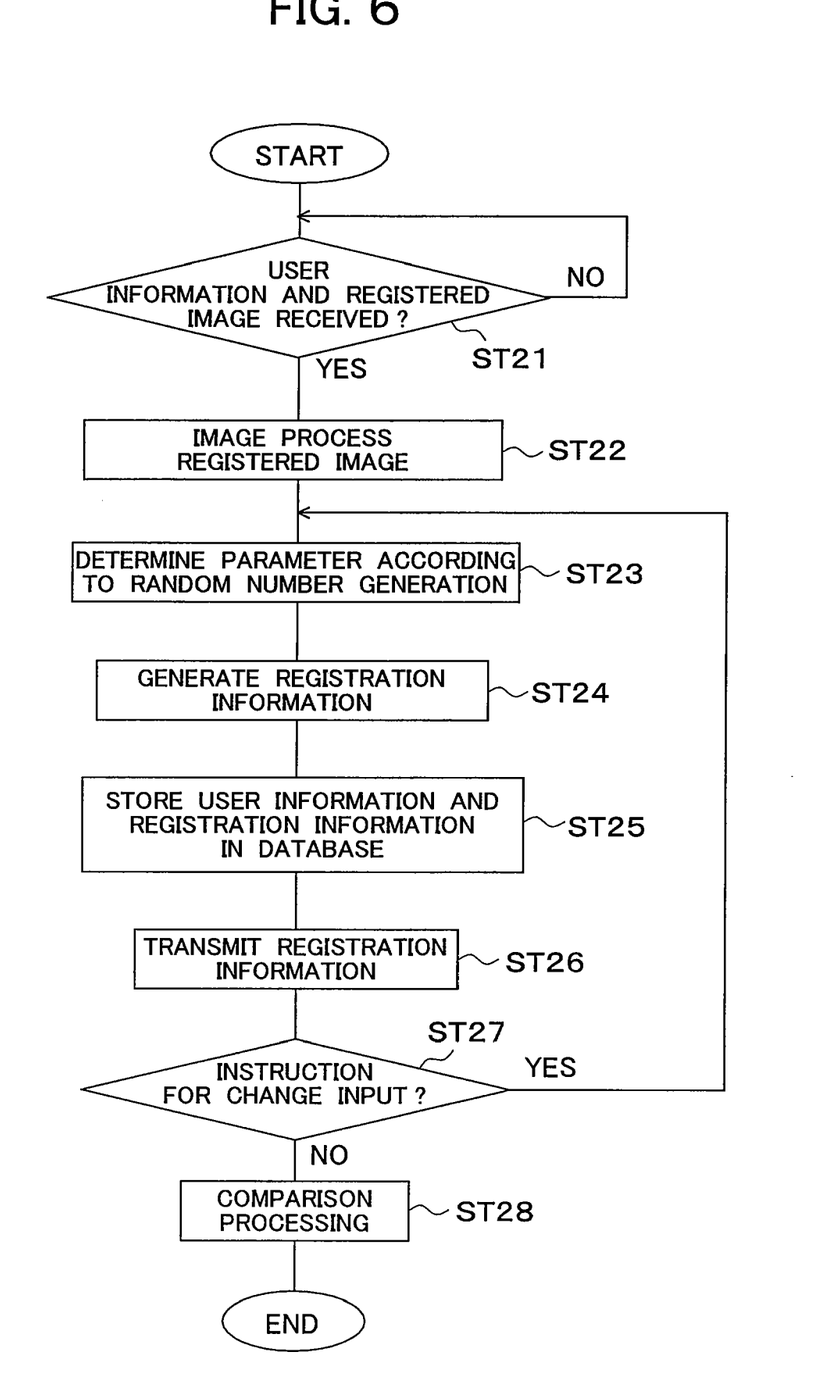
[FIG. 6] A flow chart for explaining the operation at the time of the registration of a comparison apparatus 2 of the comparison system 10 shown in FIG. 1.

FIG. 6 is a flow chart for explaining the operation at the time of the registration of the comparison apparatus 2 of the comparison system 10 shown in FIG. 1. The operation at the time of the registration of the comparison apparatus 2, mainly the operation of the control circuit 29 etc. will be explained with reference to FIG. 6.

At step ST21, the control circuit 29 of the comparison apparatus 2 judges whether or not it has received the user information and the registered image (biometric characteristic information) AIM from the terminal apparatus 1 by the communication I/F 21 and stands by until reception. When judging that they are received, the control circuit 29 proceeds to the processing of step ST22.

At step ST22, the control circuit 29 makes the image processing unit 23 perform image processing such as thinning of the registered image AIM and obtains the image of the output result.

At step ST23, the control circuit 29 sets the parameter. In more detail, the control circuit 29 sets the set position (reference point) BP($x_0$, $y_0$) as the parameter for generating the registration information RT1 (template) based on for example the random numbers generated at the random number generation unit 24.

At step ST24, the control circuit 29 makes the table generation unit 25 generate the registration information RT1 by applying the generalized Hough transform to the registered image AIM based on the set parameter as shown in FIGS. 2 and 3.

In more detail, the table generation unit 25 generates, as the generalized Hough transform, for example as shown in FIG. 2(a), registration information RT1 which links, at the picture element position P(x, y) on the image pattern in the registered image AIM, first angle information $\phi$(x, y) indicating the angle formed by the straight line L2 perpendicular to the tangent TL1 of the image pattern IP and the straight line BLX passing through the picture element position P(x, y) and parallel to the reference axis (x-axis), distance information R indicating the distance between the picture element position P(x, y) and the set position (also referred to as the reference point) BP($x_0$, $y_0$) indicating the set parameter, and second angle information $\alpha$(x, y) indicating the angle formed by the straight line r including the picture element position P(x, y) and the set position BP($x_0$, $y_0$) and the reference axis BLX.

At step ST25, the control circuit 29 stores the registration information RT1 in the database 22 linked with the user information.

At step ST26, the control circuit 29 transmits the generated registration information (template information) RT1 via the communication I/F 21 to the terminal apparatus 1 and makes it store the same in the storage unit 14 of the terminal apparatus 1.

At step ST27, the control circuit 29 judges, for example, whether or not an instruction for change of the registration information RT1 is input from a not shown input unit. When an instruction for change is input, it performs the processing of steps ST23 to ST26 again to thereby change the parameter mentioned above, applies the generation processing shown at step S24 to the registered image AIM based on the changed parameter to generate new registration information Rt1, and stores the same in the database 22.

This change of registration information RT1 may be carried out for each comparison and may be carried out at a previously set timing. That is, the instruction for change of the registration information RT1 may be input for each comparison or may be input at a previously set timing.

On the other hand, in the judgment of step ST27, when judging that an instruction for change of the registration information RT1 has not been input, as will be explained later, the comparison processing is carried out based on the input comparison image RIM and the registration information RT1 stored in the database 22.

Figures 7A, 7B, 7C:
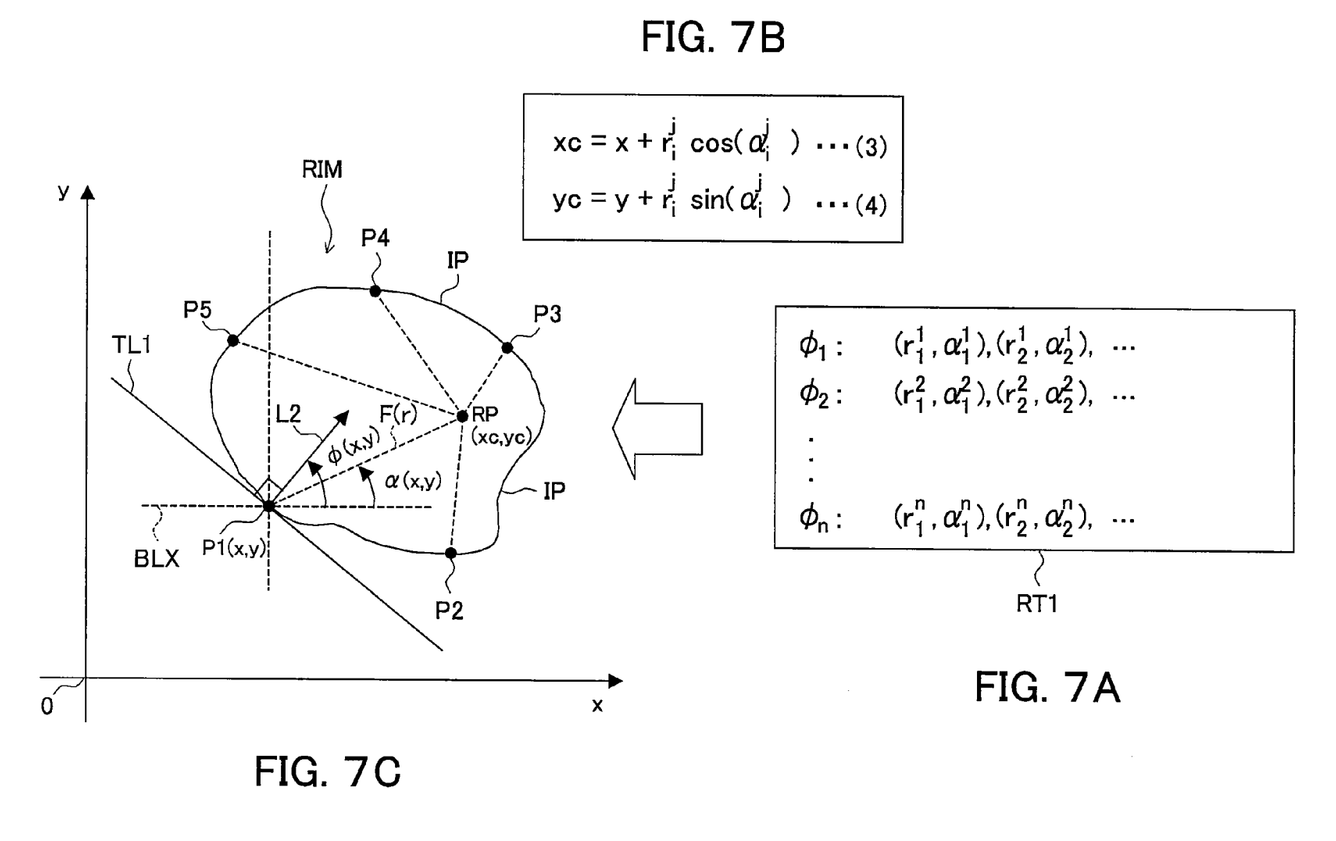
FIG. 7A is a diagram showing the R-table as the registration information.
FIG. 7B is a diagram for explaining processing for determining a picture element position for a comparison judgment.
FIG. 7C is a diagram for explaining processing for determining the picture element position for the comparison judgment by using the R-table shown in FIG. 7A and a comparison image.

FIG. 7A to FIG. 7C are diagrams for explaining the operation at the time of comparison of the terminal apparatus 1 shown in FIG. 1. FIG. 7A is a diagram showing the R-table as the registration information. FIG. 7B is a diagram for explaining the processing for determining the picture element position for the comparison judgment. FIG. 7C is a diagram for explaining the processing for determining the picture element position for the comparison judgment by using the R-table shown in FIG. 7A and the comparison image.

For example, the comparison processing unit 27 performs the comparison processing utilizing the generalized Hough transform based on the input comparison image and the registration information RT1 stored in the database 22.

The comparison processing unit 27 generates third angle information $\phi$(x, y) indicating the angle formed by the straight line L2 perpendicular to the tangent TL1 of the image pattern IP and the straight line BLX passing through a picture element position P1(x, y) and parallel to the reference axis (x-axis) at the picture element position P1(x, y) on the image pattern IP in the comparison image RIM and, based on the distance information r(x, y) linked with the first angle information $\phi$(x, y) corresponding to the third angle $\phi$(x, y) included in the registration information RT1 shown in FIG. 7A and the second angle information $\alpha$(x, y), as shown in FIG. 7B and Equations 3 and 4, determines a picture element position RP(xc, yc) for the comparison judgment, performs the same computation for picture element positions P2, P3, . . . on the image pattern in the comparison image RIM, and performs the comparison processing based on the result of comparison between a degree of superimposition of the picture element position RP(xc, yc) for the comparison judgment and the set value.

[Equation 3]

$$xc = x + r_i^j \cos(\alpha_i^j) \quad (3)$$

[Equation 4]

$$yc = y + r_i^j \cos(\alpha_i^j) \quad (4)$$

Further, in more detail, the comparison processing unit 27 judges that the registered image AIM and the comparison image RIM coincide when the degree of superimposition of the picture element position RP(xc, yc) for the comparison judgment is larger than the set value.

In more detail, when the comparison image RIM is the same as or resembles the registered image AIM, the unit performs the same computation for the picture element positions P1, P2, P3, . . . on the image pattern in the comparison image RIM. As a result, the degree of superimposition becomes the largest at the point RP(xc, yc) corresponding to the set position (also referred to as the reference point) BP($x_0$, $y_0$) indicating the parameter. The unit judges that the two coincide when this degree of superimposition is larger than the set threshold value.

Figure 8:
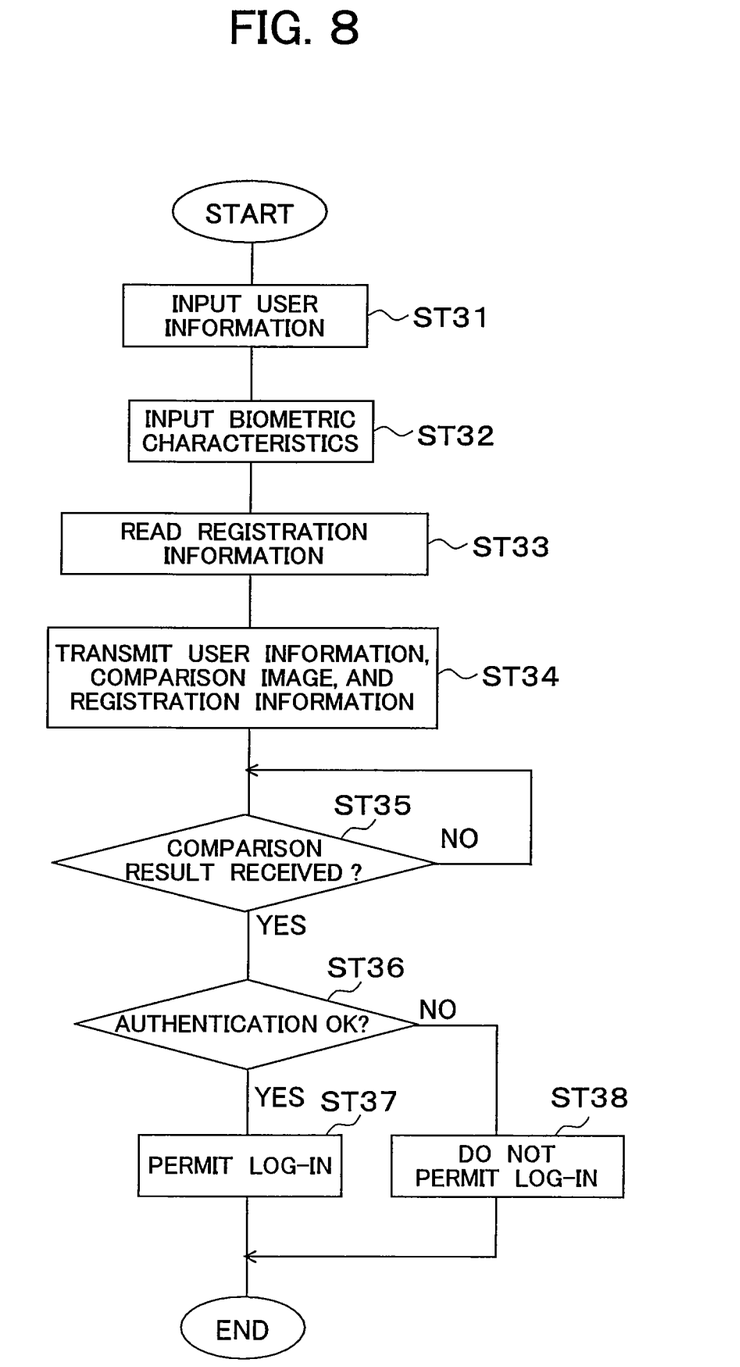
[FIG. 8] A flow chart for explaining the operation at the time of comparison of the terminal apparatus 1 of the comparison system 10 shown in FIG. 1.
Figure 9:
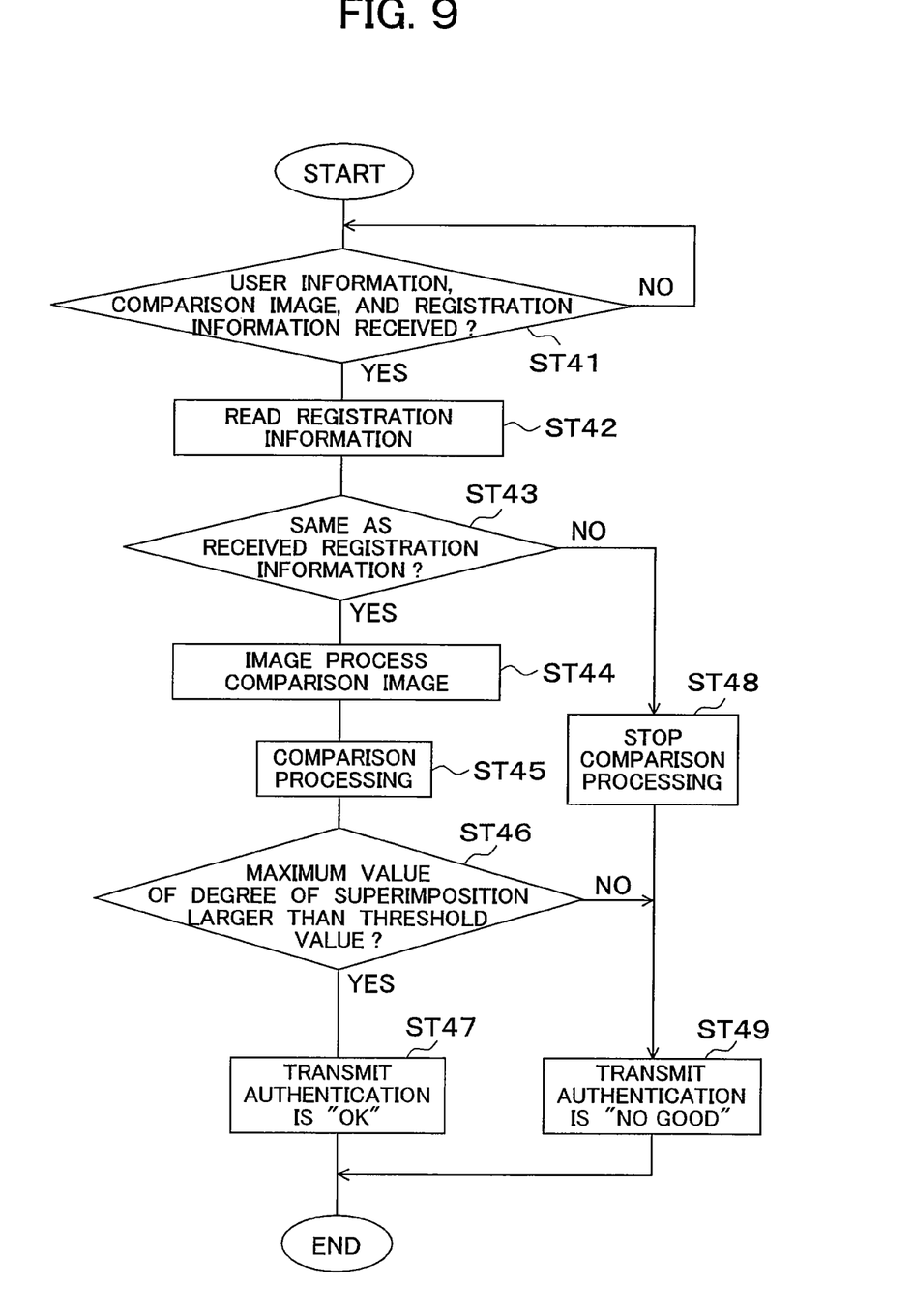
[FIG. 9] A flow chart for explaining the operation at the time of the comparison of the comparison apparatus 2 of the comparison system 10 shown in FIG. 1.

FIG. 8 is a flow chart for explaining the operation at the time of the comparison of the terminal apparatus 1 of the comparison system 10 shown in FIG. 1. FIG. 9 is a flow chart for explaining the operation at the time of the comparison of the comparison apparatus 2 of the comparison system 10 shown in FIG. 1.

The operation at the time of the comparison of the comparison system 10 will be explained with reference to FIG. 7A to FIG. 7C, FIG. 8, and FIG. 9.

As shown in FIG. 8, at step ST31, in the terminal apparatus 1, the user information is input to the control circuit 16 by the input unit 12.

At step ST32, based on the result of imaging of the subject from the biometric characteristic input unit 13, the comparison image RIM indicating the biometric characteristics inherent to the user is input to the control circuit 16.

At step ST33, the control circuit 16 reads the registration information RT1 stored in the storage unit 14.

At step ST34, the control circuit 16 transmits the user information and the registration information RT1 via the communication I/F 11 to the comparison apparatus 2.

At step ST35, the control circuit 16 stands by until it receives a signal indicating the comparison result corresponding to the previously transmitted user information and registration information RT1 (also summarized as authentication information) from the comparison apparatus 2 and proceeds to the processing of step ST36 when receiving this.

At step ST36, the control circuit 16 judges whether or not the comparison result indicated by the received signal is that the authentication is OK (approved) and permits log-in for the user when the authentication is OK (approved) (ST37). In more detail, the control circuit 16 informs the user that the authentication is OK (approved) by a screen display etc. and performs the log-in processing.

On the other hand, when the comparison result is that the authentication is "No Good" at step ST36, the control circuit 16 does not permit the log-in for the user (ST38).

In more detail, the control circuit 16 informs the user that the authentication is "No Good" by the screen display etc. and blocks the log-in processing.

Next, the operation at the time of the comparison of the comparison apparatus 2 will be explained with reference to FIG. 9.

At step ST41, the control circuit 29 of the comparison apparatus 2 judges whether or not the authentication information (user information, comparison image RIM, registration information RT1) is received from the terminal apparatus 1 by the communication I/F 21 and stands by until reception. When judging the reception as the result of judgment, the control circuit 29 proceeds to the processing of step ST42.

At step ST42, the control circuit 29 reads the registration information RT1 linked with the received user information from the database 22.

At step ST43, the control circuit 29 compares the read registration information RT1 and the registration information RT1 received from the terminal apparatus 1 by the communication I/F 21 at the table comparison unit 26 and judges whether or not they coincide.

When judging the coincidence as the result of judgment, the control circuit 29 proceeds to the processing of step ST44, while when judging that they do not coincide, proceeds to the processing of step ST48.

This comparison processing can be carried out in a shorter time in comparison with the comparison processing according to the following image processing for comparing tables with each other.

At step ST44, the control circuit 29 for example makes the image processing unit 23 apply image processing such as thinning (narrowing) processing to the comparison image RIM in the same way as that at the time of registration according to need.

At step ST45, the control circuit 29 makes the comparison processing unit 27 perform the comparison processing mentioned above.

In more detail, the comparison processing unit 27 generates third angle information $\phi$ indicating the angle formed by the straight line L2 perpendicular to the tangent TL1 of the image pattern IP and the straight line BLX passing through the picture element position P1($x$, y) and parallel to the reference axis (x-axis) at the picture element position P1($x$, y) on the image pattern IP in the comparison image RIM and, based on the distance information r linked with the first angle information $\phi$ corresponding to the third angle $\phi$ included in the registration information RT1 shown in FIG. 7A and the second angle information $\alpha$, as shown in FIG. 7B and Equations 3 and 4, determines the picture element position RP(xc, yc) for the comparison judgment, performs the same computation for picture element positions P2, P3, . . . on the image pattern in the comparison image RIM and generates the image pattern indicating the degree of superimposition of the picture element position RP(xc, yc) for the comparison judgment.

At step ST46, the control circuit 29 judges for example whether or not the degree of superimposition is larger than the set value (threshold value) for the picture element position where the degree of superimposition becomes the maximum as the result of computation according to step ST45. When the degree of superimposing is larger than the threshold value as a result of comparison, the control circuit 29 proceeds to the processing of step ST47, while when it is the threshold value or less, judges that the input comparison image RIM does not coincide with the registered image AIM corresponding to the registered registration information RT1 and proceeds to the processing of step ST49.

At step ST47, when judging that the degree of superimposition is larger than the threshold value, the control circuit 29 judges that the input comparison image RIM coincides with the registered image AIM corresponding to the registered registration information RT1 and transmits a signal indicating that the authentication is OK to the terminal apparatus 1 via the communication I/F 21. The terminal apparatus 1 performs the log-in processing as explained above when receiving that signal via the communication I/F 11.

On the other hand, at step ST43, when judging that the read registration information RT1 and the registration information RT1 received from the terminal apparatus 1 do not coincide, the control circuit 29 blocks for example the comparison processing of steps ST44 to ST47 (ST48) and proceeds to the processing of step ST49.

At step ST49, the control circuit 29 transmits a signal indicating that the authentication is "No Good" to the terminal apparatus 1 via the communication I/F 21. The terminal apparatus 1 informs the user of that by a screen display etc. when receiving that signal via the communication I/F 11.

As explained above, the comparison apparatus 2 designates the first registration information RT1 inherent to the first parameter obtained by applying the generalized Hough transform processing to the registered image AIM based on the set first parameter as the registration information RT1 used for the comparison and, when receiving an instruction for change of the registration information RT1 after the designation, designates the second registration information RT1 obtained by applying generalized Hough transform processing to the registered image AIM based on the second parameter different from the first parameter as the registration information RT1 used for the comparison, therefore the security can be improved.

Further, at the time of the registration, the comparison apparatus 2 applies processing for generating different registration information (R-table) RT1 in accordance with the set parameter, in more detail, the generalized Hough transform processing, to the registered image AIM, stores the registration information RT1 generated by the processing in the database 22. When an instruction for change of the registration information RT1 is input, it changes the parameter, applies the generalized Hough transform processing again to the registered image AIM based on the changed parameter to generate the new registration information RT1, stores the same in the database 22. At the time of comparison, it performs the comparison processing based on the input comparison image RIM and the registration information RT1 stored in the database 22, therefore the security can be raised (improved).

In more detail, not the registered image AIM for the comparison, but the registration information RT1 is stored in the database 22. Therefore, even in the case where for example the registration information RT1 is leaked to a third party, the case where it is stolen, the case where the registration information RT1 is discarded, or the like, since it is difficult to deduce the registered image AIM from the registration information RT1, the security is high.

At that time, by generating new different registration information RT1 by changing the parameter for the same registration information RT1, for example when the registration information RT1 is illicitly leaked, it is possible to prevent illicit access utilizing the leaked registration information RT1 by newly generating the registration information RT1.

Further, the same registration information RT1 is stored in the database 22 of the comparison apparatus 2 and the storage unit 14 of the terminal apparatus 1. At the time of the comparison, it is judged whether or not the registration information RT1 stored in the database 22 of the comparison apparatus 2 and the registration information RT1 stored in the storage unit 14 of the terminal apparatus 1 coincide. The comparison processing is carried out under the condition that the coincidence is judged. Therefore, the comparison probability can be further raised. Further, when the registration information RT1 do not coincide, the comparison processing is blocked, therefore the processing time is reduced.

That is, when access is made by using the illicitly leaked registration information RT1, it is possible to detect illicit access and prevent this in a short time.

Further, at the time of the registration, the generalized Hough transform processing is applied to the registered image AIM to generate the registration information (R-table) RT1 based on the set parameter. At the time of the comparison, that registration information RT1 and the comparison image RIM are used to judge the degree of superimposition according to the above processing and perform the comparison processing, therefore high precision comparison can be carried out.

Further, in the present embodiment, the parameter was determined based on random numbers from the random number generation unit 24 at the time of the registration, therefore the registration information RT1 can be generated at a high speed.

Further, at the time of the comparison, even when there is no information concerning the parameter, the comparison processing can be carried out by an easy processing as mentioned above based on the registration information RT1 and the comparison image RIM, therefore the comparison processing can be carried out at a high speed.

Note that the present invention is not limited to the present embodiment. Any suitable modifications are possible.

For example, in the present embodiment, the processing according to the present invention was carried out by the terminal apparatus 1 and the comparison apparatus 2, but the present invention is not limited to this format. For example, the terminal apparatus 1 and the comparison apparatus 2 may be realized by the same computer.

Further, in the above embodiment, the registration information RT1 is generated by setting the parameter by utilizing random numbers at the time of the registration processing, but new registration information RT1 may be generated by changing the parameter whenever the authentication processing succeeds, new registration information RT1 may be generated when an instruction for change is input, and new registration information RT1 may be generated at any timing. By performing this, the security with respect to for example leakage of the registration information RT1 can be further raised.

Further, by encrypting various types of information for the transmission and reception of data between the terminal apparatus 1 and the comparison apparatus 2, it is also naturally possible to raise the security with respect to communication.

Further, the functions according to the present invention may be accomplished by only the control circuit or may be realized by providing a dedicated circuit for each component. Further, the functions according to the present invention may be realized by running a program or may be realized by hard wiring.

Further, in the present embodiment, the apparatus and operation according to the present invention were explained concerning biometric information, but the present invention is not limited to this format. For example, the present invention can also be applied to an apparatus for image comparison for any image.

INDUSTRIAL APPLICABILITY

The present invention can be applied to a comparison system etc. for comparing images.

The invention claimed is:

1. A comparison method for comparing images by using registered information, including:
   a first step of designating a first registration information inherent to a first parameter obtained by processing a registered image based on a set first parameter, as said registration information used for said comparison; and
   a second step of, when receiving an instruction for change of said registration information after said designation in said first step, designating second registration information obtained by performing said processing of said registered image based on a second parameter different from said first parameter, as the registration information used for said comparison,
   wherein,
      in said first step, a generalized Hough transform processing is carried out to said registered image based on said set first parameter to generate said registration information, and
      in said first step, as the result of said generalized Hough transform, said registration information is generated, said registration information linking, at a picture element position on an image pattern in said registered image, first angle information indicating the angle formed by a straight line perpendicular to a tangent of said image pattern and a straight line passing through said picture element position and parallel to a reference axis, distance information indicating the distance between said picture element position and a set position indicating said set first parameter, and second angle information indicating the angle formed by a straight line including said picture element position and said set position and said reference axis.

2. A comparison method for comparing images by using registered information, including:
   a first step of designating a first registration information inherent to a first parameter obtained by processing a registered image based on a set first parameter, as said registration information used for said comparison;
   a second step of, when receiving an instruction for change of said registration information after said designation in said first step, designating second registration information obtained by performing said processing of said registered image based on a second parameter different from said first parameter, as the registration information used for said comparison; and
   a third step of performing comparison processing based on an input image and said designated registration information, wherein,
in said third step, a third angle information which indicates the angle formed by the straight line perpendicular to the tangent of said image pattern and the straight line passing through said picture element position and parallel to the reference axis at the picture element position on the image pattern in said comparison image is generated;
a picture element position for the comparison judgment is determined based on the distance information linked with said first angle information corresponding to said third angle included in said registration information and the second angle information; and
said comparison processing is carried out based on the result of comparison between a degree of superimposition of the picture element position for the comparison judgment and the set value.

3. A comparison method including;
a first step of applying a generalized Hough transform processing to a registered image based on a set parameter and storing the resultant registration information inherent to said parameter in a storing means; and
a second step of performing a comparison processing based on an input image and the registration information stored in said storing means in said first step,
wherein,
in said first step, as the result of said generalized Hough transform, said registration information is generated, said registration information linking, at a picture element position on an image pattern in said registered image, first angle information indicating the angle formed by a straight line perpendicular to a tangent of said image pattern and a straight line passing through said picture element position and parallel to a reference axis, distance information indicating the distance between said picture element position and a set position indicating said set first parameter, and second angle information indicating the angle formed by a straight line including said picture element position and said set position and said reference axis.

4. A comparison method for a comparison system including a terminal apparatus and a comparison apparatus for comparing an image input from the terminal apparatus, said method including:
a first step of designating first registration information inherent to a first parameter obtained by processing a registered image based on a set first parameter as said registration information used for said comparison, storing the designated registration information in a first storing means of said comparison apparatus, and then storing the registration information in a second storing means of said terminal apparatus;
a second step of, when receiving an instruction for change of said registration information after said designation in said first step, designating second registration information obtained by performing processing of said registered image based on a second parameter different from said first parameter, as the registration information used for said comparison, and storing the registration information in said first storing means and said second storing means; and
a third step of performing comparison processing based on the image input from said terminal apparatus and the registration information stored in said first storing means, when said comparison apparatus compare the registration information stored in said first storing means and the registration information stored in said second storing means and the result of the comparison is that they coincide,
wherein,
in said third step, a third angle information which indicates the angle formed by the straight line perpendicular to the tangent of said image pattern and the straight line passing through said picture element position and parallel to the reference axis at the picture element position on the image pattern in said comparison image is generated;
a picture element position for the comparison judgment is determined based on the distance information linked with said first angle information corresponding to said third angle included in said registration information and the second angle information; and
said comparison processing is carried out based on the result of comparison between a degree of superimposition of the picture element position for the comparison judgment and the set value.

5. A comparison method as set forth in claim 4, wherein, in said third step, said comparison processing is stopped when the result of comparison is that they do not coincide.

6. A comparison method as set forth in claim 4, wherein, in said first step, the generalized Hough transform processing is carried out to said registered image based on said set first parameter to generate said registration information.

7. A comparison system comprising a terminal apparatus and a comparison apparatus for comparing an image input from the terminal apparatus,
said comparison apparatus comprising:
a first communicating means for data communication with said terminal apparatus;
a first storing means; and
a first controlling means specially configured to (a) designate first registration information inherent to a first parameter obtained by processing a registered image based on a set first parameter, as said registration information used for said comparison, at the time of the registration, (b) designate second registration information obtained by performing said processing of said registered image based on a second parameter different from said first parameter, as the registration information used for said comparison, when receiving an instruction for change of said registration information after said designation, (c) store the registration information in said first storing means, (d) then output the registration information via said first communicating means to said terminal apparatus, (e) compare, at the time of the comparison, the registration information stored in said first storing means and the registration information received from said terminal apparatus via said first communicating means, and (f) perform the comparison processing based on the image received from said terminal apparatus and the registration information stored in said first storing means when the result of the comparison is that they coincide, and said terminal apparatus comprising:
a second communicating means for performing data communications with said comparison apparatus;
an inputting means for inputting at least said image;
a second storing means; and
a second controlling means specially configured to store said registration information received from said comparison apparatus at the time of the registration via said second communicating means in said second storing means, and transmit the image input from said inputting means at the time of the comparison and the registration information read out from said second storing means via said second communicating means to said comparison apparatus, wherein, the first controlling means is configured such that, when designating said first registration information inherent to said first parameter, it carries out a generalized Hough transform processing to said registered image based on said set first parameter to generate said registration information, and as the result of said generalized Hough transform, said registration information is generated, said registration information linking, at a picture element position on an image pattern in said registered image, first angle information indicating the angle formed by a straight line perpendicular to a tangent of said image pattern and a straight line passing through said picture element position and parallel to a reference axis, distance information indicating the distance between said picture element position and a set position indicating said set first parameter, and second angle information indicating the angle formed by a straight line including said picture element position and said set position and said reference axis.

8. A non-transitory tangible recording medium having stored thereon program code executable by a processor to effect a comparison method for comparing images by using registered information, the comparison method including:

a first step of designating a first registration information inherent to a first parameter obtained by processing a registered image based on a set first parameter, as said registration information used for said comparison; and a second step of, when receiving an instruction for change of said registration information after said designation in said first step, designating second registration information obtained by performing said processing of said registered image based on a second parameter different from said first parameter, as the registration information used for said comparison, wherein, in said first step, a generalized Hough transform processing is carried out to said registered image based on said set first parameter to generate said registration information, and in said first step, as the result of said generalized Hough transform, said registration information is generated, said registration information linking, at a picture element position on an image pattern in said registered image, first angle information indicating the angle formed by a straight line perpendicular to a tangent of said image pattern and a straight line passing through said picture element position and parallel to a reference axis, distance information indicating the distance between said picture element position and a set position indicating said set first parameter, and second angle information indicating the angle formed by a straight line including said picture element position and said set position and said reference axis.

9. A non-transitory tangible recording medium having stored thereon program code executable by a processor to effect a comparison method for comparing images by using registered information, the comparison method including:

a first step of designating a first registration information inherent to a first parameter obtained by processing a registered image based on a set first parameter, as said registration information used for said comparison;

a second step of, when receiving an instruction for change of said registration information after said designation in said first step, designating second registration information obtained by performing said processing of said registered image based on a second parameter different from said first parameter, as the registration information used for said comparison; and a third step of performing comparison processing based on an input image and said designated registration information, wherein, in said third step, a third angle information which indicates the angle formed by the straight line perpendicular to the tangent of said image pattern and the straight line passing through said picture element position and parallel to the reference axis at the picture element position on the image pattern in said comparison image is generated;

a picture element position for the comparison judgment is determined based on the distance information linked with said first angle information corresponding to said third angle included in said registration information and the second angle information; and said comparison processing is carried out based on the result of comparison between a degree of superimposition of the picture element position for the comparison judgment and the set value.

* * * * *